United States Patent
Schueler et al.

(10) Patent No.: US 10,186,932 B2
(45) Date of Patent: Jan. 22, 2019

(54) DRIVE SYSTEM

(71) Applicant: Lenze Drives GmbH, Extertal (DE)

(72) Inventors: Gerd Schueler, Badenhard (DE);
Andreas Tolksdorf, Hameln (DE);
Tino Goetz, Wennigsen (DE); Fabian Buescher, Lemgo (DE); Volker Grabs, Halle (DE); Michael Kriese, Gehrden (DE)

(73) Assignee: Lenze Drives GmbH, Extertal (DE)

( * ) Notice: Subject to any disclaimer, the term of this patent is extended or adjusted under 35 U.S.C. 154(b) by 567 days.

(21) Appl. No.: 14/889,344

(22) PCT Filed: May 8, 2014

(86) PCT No.: PCT/EP2014/059470
§ 371 (c)(1),
(2) Date: Feb. 22, 2016

(87) PCT Pub. No.: WO2014/180958
PCT Pub. Date: Nov. 13, 2014

(65) Prior Publication Data
US 2016/0172936 A1 Jun. 16, 2016

(30) Foreign Application Priority Data
May 8, 2013 (DE) .................. 10 2013 208 538

(51) Int. Cl.
| | |
|---|---|
| *H02K 5/00* | (2006.01) |
| *H02K 9/06* | (2006.01) |
| *H02K 5/22* | (2006.01) |
| *H02K 11/33* | (2016.01) |
| *H02K 3/04* | (2006.01) |
| *H02K 5/04* | (2006.01) |

(Continued)

(52) U.S. Cl.
CPC ............. *H02K 9/06* (2013.01); *H02K 3/04* (2013.01); *H02K 5/04* (2013.01); *H02K 5/225* (2013.01); *H02K 11/0094* (2013.01); *H02K 11/33* (2016.01); *H02K 5/18* (2013.01)

(58) Field of Classification Search
CPC . H02K 11/33; H02K 3/04; H02K 5/04; H02K 11/0094; H02K 5/18; H02K 9/06; H02K 5/225
USPC ................................. 310/71, 89, 50
See application file for complete search history.

(56) References Cited

U.S. PATENT DOCUMENTS

| | | | |
|---|---|---|---|
| 3,810,253 A * | 5/1974 | Vergara | ................ H02K 11/042 318/819 |
| 5,998,893 A | 12/1999 | Fowler et al. | |

(Continued)

FOREIGN PATENT DOCUMENTS

| | | |
|---|---|---|
| CN | 1672297 A | 9/2005 |
| CN | 101752940 A | 6/2010 |

(Continued)

OTHER PUBLICATIONS

International Search Report (PCT/ISA/210) issued in PCT Application No. PCT/EP2014/059470 dated Apr. 7, 2015 with English translation (Six (6) pages).

*Primary Examiner* — Thanh Lam
(74) *Attorney, Agent, or Firm* — Crowell & Moring LLP

(57) ABSTRACT

A drive system has an electric motor having a shaft; an electronic assembly; and a fan driven by way of the shaft, the electronic assembly being rigidly and thermally coupled to the fan.

11 Claims, 1 Drawing Sheet

(51) Int. Cl.
*H02K 11/00* (2016.01)
*H02K 5/18* (2006.01)

(56) References Cited

U.S. PATENT DOCUMENTS

| | | | |
|---|---|---|---|
| 7,234,236 B2 | 6/2007 | Derleth et al. | |
| 7,332,841 B2* | 2/2008 | Hsu | H02K 7/14 |
| | | | 310/261.1 |
| 2012/0049777 A1 | 3/2012 | Kern et al. | |
| 2013/0084197 A1 | 4/2013 | Mueller et al. | |
| 2013/0278094 A1* | 10/2013 | Peterson | H02K 1/187 |
| | | | 310/64 |
| 2015/0145382 A1* | 5/2015 | Sturm | F04D 25/068 |
| | | | 310/60 A |

FOREIGN PATENT DOCUMENTS

| | | |
|---|---|---|
| DE | 196 22 396 A1 | 12/1997 |
| DE | 103 62 051 A1 | 7/2005 |
| DE | 10 2008 010 913 A1 | 9/2008 |
| DE | 10 2007 045 413 A1 | 4/2009 |
| DE | 10 2011 083 925 A1 | 4/2013 |
| EP | 0 812 052 A1 | 12/1997 |
| FR | 2.204.920 A1 | 5/1974 |
| GB | 1 438 538 A | 6/1976 |
| JP | 11-168858 A | 6/1999 |

\* cited by examiner

DRIVE SYSTEM

BACKGROUND AND SUMMARY OF THE INVENTION

The invention relates to a drive system having an electric motor. Depending on the type of electric motor used in the drive system, it can be necessary to couple an electronic assembly, for example in the form of an inverter, with the rotor of the electric motor in rotationally fixed manner.

The invention is based on the task of making available a drive system having an electric motor that has an electronic assembly mechanically coupled with the rotor, wherein the drive system demonstrates great thermal stability.

The invention accomplishes this task by means of a drive system having: an electric motor having a shaft, an electronic assembly, and a fan that is driven by the shaft, wherein the electronic assembly is coupled with the fan in rotationally fixed manner, and thermally coupled with it.

The drive system has an electric motor, for example in the form of a synchronous or asynchronous machine, having a driven shaft. The electric motor can be operated in motor mode and/or generator mode, for example.

The drive system furthermore has at least one electronic or electrical assembly, for example in the form of a circuit board and electrical components disposed on it, such as capacitors, resistors, microprocessors, etc. The electronic assembly can be configured, at least in parts, for functional control of the electric motor.

The drive system furthermore has at least one fan that is driven, indirectly or directly, by means of the shaft, which fan generates a cooling air stream.

The electronic assembly is mechanically coupled with the fan in rotationally fixed manner and rotates with it at the fan speed of rotation, on the basis of the rotationally fixed coupling, for example. The electronic assembly is additionally thermally coupled with the fan, so that heat flow from the electronic assembly in the direction of the fan can take place.

The fan can have a fan wheel or be a fan wheel, which is coupled with the shaft in rotationally fixed manner, wherein the electronic assembly is coupled with the fan wheel in rotationally fixed and thermal manner. For example, the electronic assembly can be screwed onto the fan wheel or onto a blade surface of the fan wheel, for example using a heat-conductive paste. The blade surface of the fan wheel can have a suitably shaped contact region, for example, which region has an essentially level surface having suitable dimensions.

The electronic assembly can be integrated into the fan wheel, for example in the form that the fan wheel or a corresponding part of the fan wheel forms a housing of the electronic assembly.

The electric motor can have a fixed housing and heat-generating electrical functional groups, particularly in the form of stator windings and/or rotor windings, wherein the functional groups are disposed within the housing, and the fan wheel and the electronic assembly are disposed outside of the housing.

A thermally insulating element can be disposed between the shaft and the fan wheel, which element minimizes a heat flow from the heat-generating electrical functional groups, by way of the shaft, in the direction of the fan wheel or of the electronic assembly.

The fan wheel can consist of a material having great thermal conductivity, for example aluminum alloys, other metal alloys and/or special ceramics.

The electric motor can have heat-generating electrical functional groups, particularly in the form of rotor windings, wherein the electronic assembly is electrically and/or mechanically contacted with the electrical functional groups by means of releasable electrical contacts.

The electrical contacts can comprise a number of contact segments, for example cylindrical segments, which are disposed over a circumference of the shaft, distributed uniformly or non-uniformly.

The electronic assembly can have at least one inverter or form one or more inverters, which is/are configured for the purpose of generating triggering signals for at least one rotor winding of the electric motor. The triggering signals can be triggering currents that are generated by means of the inverter, in such a manner that a magnetic rotary field having a predeterminable speed of rotation is brought about by means of the rotor winding.

Alternatively, the electronic assembly can have or form a rectifier circuit, as it is used in separately excited electric motors supplied with energy in contact-free manner, for example. There, electric energy is inductively transmitted in the direction of the rotor in the form of a magnetic alternating field, by way of auxiliary windings, and rectified there.

The electronic assembly can have means for wireless data transmission.

BRIEF DESCRIPTION OF THE DRAWINGS

The invention will be described below, making reference to the drawings. These schematically show.

DETAILED DESCRIPTION OF THE DRAWINGS

Figure 1:
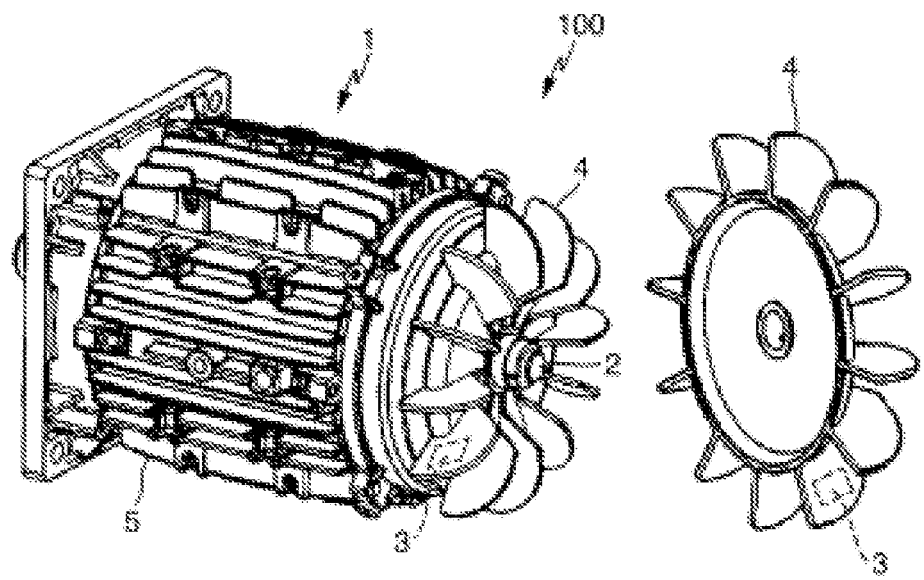
FIG. 1 a drive system according to the invention.

FIG. 1 schematically shows a drive system 100 having an electric motor 1, a fan wheel 4 for cooling the drive system 100, and an electronic assembly in the form of an inverter 3.

The electric motor 1 has a shaft 2, a housing 5, and, within the housing 5, a rotor winding system or a rotor winding (not shown) and a stator winding system (not shown), wherein the stator winding system is firmly connected with a three-phase network, and the rotor winding or the rotor winding system is triggered by means of the inverter 3. The drive system 100 forms a double-fed asynchronous machine, for example.

The fan wheel 4 consists of an aluminum alloy and is mechanically coupled with the shaft 2 in rotationally fixed manner, i.e. the fan wheel 4 and the shaft 2 rotate at identical angular velocities.

The inverter 3 is integrated into the fan wheel 4, in that the fan wheel 4 forms a housing of the inverter 3. For this purpose, the fan wheel 4 can have a suitable housing region into which the inverter 3 or an inverter board can be inserted. The inverter 3 can be mechanically fixed in place by means of a screw connection.

Figure 2:
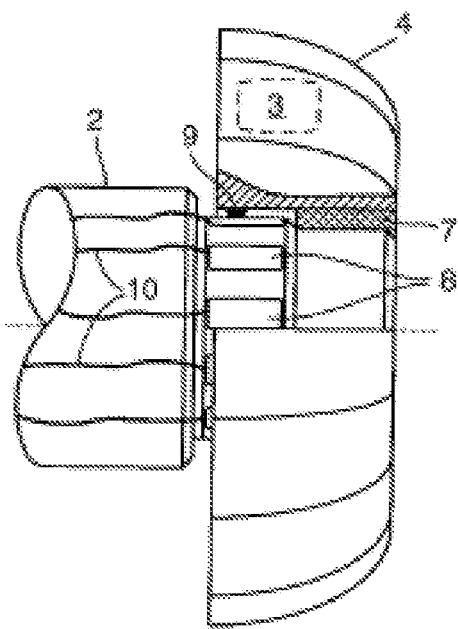
FIG. 2 a shaft with related thermal insulation and contact segments of the drive system shown in FIG. 1.

FIG. 2 shows the shaft 2 with a thermally insulating element in the form of an insulation sleeve 7 composed of thermally poorly conductive material, which sleeve is disposed radially between the shaft 2 and the fan wheel 4, and reduces a radial heat flow from the shaft 2 in the direction of the fan wheel 4 or of the inverter 3.

Further electrical contacts in the form of a number of contact segments 8 disposed on the shaft 2, distributed over its circumference, are provided on the shaft 2, which segments are mechanically connected with the shaft 2 in rotationally fixed manner and serve to electrically contact the inverter 3 with the rotor windings.

The contact segments 8 and the rotor windings are electrically connected with one another by means of electrical lines 10 that run axially. The lines 10 can be adhesively attached to the shaft 2, for example.

Corresponding to the contact segments 8, pressure contacts 9 can be provided, wherein a respective contact segment 8 and a related pressure contact 9 implement a releasable electrical connection.

The inverter 3 can furthermore have means for wireless data transmission, for example an RFID transponder, etc.

The invention takes the problem into account that typical permissible motor operation temperatures or winding temperatures are generally higher than typical permissible operating temperatures of electronic assemblies that are disposed on the rotor in fixed manner.

The invention makes it possible to protect the electronic assembly 3, which is disposed on the movable part of the motor 1, from waste heat that is emitted by motor windings in the interior of the housing 5. In addition, the waste heat that is emitted by the electronic assembly 3 itself is effectively conducted away.

The fan wheel 4 serves to generate a cooling air stream, which necessarily flows also over the surface of the fan wheel 4 itself, particularly over its blade surfaces. The fan wheel is therefore particularly well suited for conducting away the heat inherent to it or heat conducted to it. The fan wheel 4 can be disposed both within the housing 5 and outside of the housing 5, wherein it can be enclosed by a fan hood (not shown), which serves as protection against touching and as an air guide element.

The electronic assembly 3 is disposed in such a manner that it stands in thermal contact with the material of the fan wheel 4 and thereby can give off heat to the fan wheel 4.

At the same time, the fan wheel 4 can be the housing for the electronic assembly 3.

The fan wheel 4 can be disposed outside of the fixed part of the drive system 100 or of the housing 5, together with the electronic assembly 3, wherein the electronic assembly 3 is coupled with the hot part of the drive system 100 within the housing 5 only in thermally weak manner, by way of the shaft 2. This weak thermal coupling can be further reduced by means of an additional thermal uncoupling connection element 7 between shaft 2 and fan wheel 4, so that heat transfer from the housing 5 in the direction of the electronic assembly 3 disposed outside of the housing 5 is furthermore clearly reduced.

In order to optimally conduct heat away from the electronic assembly 3, the fan wheel 4 can consist of a material having great thermal conductivity, for example of an aluminum alloy, other metal alloys or special ceramics.

A connection between the moving part of the machine, for example in the form of one or more rotor windings, and the electronic assembly 3 disposed on the fan wheel 4 can be structured as a releasable mechanical and electrical contact connection, so that the electronic assembly 3 can be replaced with a replacement assembly, in simple manner, in the event of a defect.

A possible embodiment of the contacts on the shaft side can be structured, for example, in the same manner as in the case of commutator contacts of a universal motor, which consist of cylindrical contact segments that are disposed uniformly over the circumference of the shaft.

The invention claimed is:

1. A drive system, comprising:
   an electric motor having a shaft;
   an electronic assembly; and
   a fan that is driven by the shaft, the fan having a fan wheel,
   wherein the electronic assembly is coupled with the fan in rotationally fixed manner, and thermally coupled with the fan, and
   wherein the electronic assembly is integrated into the fan wheel, and/or wherein the fan wheel forms a housing of the electronic assembly.

2. The drive system according to claim 1, wherein the fan wheel is coupled with the shaft in rotationally fixed manner, and wherein the electronic assembly is coupled with the fan wheel in rotationally fixed and thermal manner.

3. The drive system according to claim 2, wherein the electric motor has a housing and heat-generating electric functional groups, in the form of stator windings and/or rotor windings, wherein the functional groups are disposed within the housing, and the fan wheel and the electronic assembly are disposed outside of the housing.

4. The drive system according to claim 3, wherein a thermal insulating element is disposed between the shaft and the fan wheel.

5. The drive system according to claim 1, wherein the fan wheel consists of a material having great thermal conductivity.

6. The drive system according to claim 3, wherein the fan wheel consists of a material having great thermal conductivity.

7. The drive system according to claim 1, wherein the electric motor has heat-generating electrical functional groups, in the form of rotor windings, wherein the electronic assembly is electrically contacted with the electrical functional groups by way of releasable electrical contacts.

8. The drive system according to claim 3, wherein the electric motor has heat-generating electrical functional groups, in the form of rotor windings, wherein the electronic assembly is electrically contacted with the electrical functional groups by way of releasable electrical contacts.

9. The drive system according to claim 7, wherein the electrical contacts comprise a number of contact segments, which are disposed distributed over a circumference of the shaft.

10. The drive system according to claim 1, wherein the electronic assembly has at least one inverter, which is configured for the purpose of generating triggering signals for a rotor winding of the electric motor.

11. The drive system according to claim 1, wherein the electronic assembly has means for wireless data transmission.

* * * * *